(12) United States Patent
Hatabu

(10) Patent No.: US 8,243,813 B2
(45) Date of Patent: Aug. 14, 2012

(54) MOVING PICTURE DECODING DEVICE, MOVING PICTURE DECODING PROGRAM, AND MOVING PICTURE DECODING METHOD

(75) Inventor: Atsushi Hatabu, Tokyo (JP)

(73) Assignee: NEC Corporation, Tokyo (JP)

( * ) Notice: Subject to any disclaimer, the term of this patent is extended or adjusted under 35 U.S.C. 154(b) by 319 days.

(21) Appl. No.: 12/594,749

(22) PCT Filed: Apr. 24, 2008

(86) PCT No.: PCT/JP2008/057897
§ 371 (c)(1),
(2), (4) Date: Oct. 5, 2009

(87) PCT Pub. No.: WO2008/136338
PCT Pub. Date: Nov. 13, 2008

(65) Prior Publication Data
US 2010/0046636 A1 Feb. 25, 2010

(30) Foreign Application Priority Data
Apr. 26, 2007 (JP) .................. 2007-117141

(51) Int. Cl.
*H04N 11/02* (2006.01)
*H04N 11/04* (2006.01)
*H04N 7/12* (2006.01)

(52) U.S. Cl. .......... 375/240.2; 375/240.18; 375/240.24; 375/240.25

(58) Field of Classification Search . 375/240.01–240.29
See application file for complete search history.

(56) References Cited

U.S. PATENT DOCUMENTS
7,965,776 B2 * 6/2011 Kuroki et al. ............ 375/240.25
2002/0163967 A1 * 11/2002 Youn et al. ............... 375/240.12
2005/0080784 A1 * 4/2005 Hashimoto et al. ............... 707/7
2006/0146929 A1 * 7/2006 Tikhotski et al. ........ 375/240.03

FOREIGN PATENT DOCUMENTS

| JP | 4-70060 A | 3/1992 |
|---|---|---|
| JP | 9-187001 A | 7/1997 |
| JP | 9-187002 A | 7/1997 |
| JP | 10-304373 A | 11/1998 |
| JP | 2006101321 A | 4/2006 |

OTHER PUBLICATIONS

International Search Report for PCT/JP2008/057897 mailed Aug. 5, 2008.

(Continued)

*Primary Examiner* — Joseph Ustaris
*Assistant Examiner* — Hang Gao
(74) *Attorney, Agent, or Firm* — Michael Dryja

(57) ABSTRACT

The moving picture decoding device receives a moving picture bit stream compressed according to a coding method using interframe prediction and 2-dimensional discrete cosine transform. The device generates a decoded picture in a block unit from an interframe prediction picture generated by decoding the bit stream and a prediction residual generated by performing the 2-dimensional discrete cosine transform and integerization processing on a discrete cosine transform coefficient. The device judges, block-by-block, whether it is highly probable that the prediction residual of "0" is obtained by the processing of the 2-dimensional discrete cosine transform and integerization executed by the encoding device when compressing the bit stream. If YES, the interframe prediction picture is selected and outputted. Otherwise, the prediction residual generated by the decoding device is added to the interframe prediction picture so as to obtain a picture, which is selected and outputted.

9 Claims, 12 Drawing Sheets

OTHER PUBLICATIONS

IEEE Std 1180-1990, "IEEE standard Specifications for the Implementation of 8x8 Inverse Discrete Cosine Transform", Dec. 6, 1990, pp. 7-13.

ISO/IEC 14496-2, "Information Technology—Coding of audio-visual objects—Part 2: Visual", Jun. 1, 2004, pp. 246, 441-442.

ITU-T Recommendation H.263, Series H: Audiovisual and Multimedia Systems, Infrastructure of audiovisual services—Coding of moving video, "Video coding for low bit rate communication", Jan. 2005, pp. 13.

* cited by examiner

FIG. 2

|  | u<br>0 | 1 | d<sub>REF</sub><br>2 | 3 | 4 | 5 | 6 | 7 |
|---|---|---|---|---|---|---|---|---|
| v 0 | .375 | (.520) | <.490> | (.520) | .375 | (.520) | <.490> | (.520) |
| 1 | (.520) | .722 | .680 | .722 | (.520) | .722 | .680 | .722 |
| 2 | <.490> | .680 | .640 | .680 | <.490> | .680 | .640 | .680 |
| 3 | (.520) | .722 | .680 | .722 | (.520) | .722 | .680 | .722 |
| 4 | .375 | (.520) | <.490> | (.520) | .375 | (.520) | <.490> | (.520) |
| 5 | (.520) | .722 | .680 | .722 | (.520) | .722 | .680 | .722 |
| 6 | <.490> | .680 | .640 | .680 | <.490> | .680 | .640 | .680 |
| 7 | (.520) | .722 | .680 | .722 | (.520) | .722 | .680 | .722 |

| u<br>v | 0 | 1 | 2 | 3 | 4 | 5 | 6 | 7 |
|---|---|---|---|---|---|---|---|---|
| 0 | 4.80 | 3.46 | 3.67 | 3.46 | 4.80 | 3.46 | 3.67 | 3.46 |
| 1 | 3.46 | 2.50 | 2.65 | 2.50 | 3.46 | 2.50 | 2.65 | 2.50 |
| 2 | 3.67 | 2.65 | 2.81 | 2.65 | 3.67 | 2.65 | 2.81 | 2.65 |
| 3 | 3.46 | 2.50 | 2.65 | 2.50 | 3.46 | 2.50 | 2.65 | 2.50 |
| 4 | 4.80 | 3.46 | 3.67 | 3.46 | 4.80 | 3.46 | 3.67 | 3.46 |
| 5 | 3.46 | 2.50 | 2.65 | 2.50 | 3.46 | 2.50 | 2.65 | 2.50 |
| 6 | 3.67 | 2.65 | 2.81 | 2.65 | 3.67 | 2.65 | 2.81 | 2.65 |
| 7 | 3.46 | 2.50 | 2.65 | 2.50 | 3.46 | 2.50 | 2.65 | 2.50 |

FIG. 9

| SETTING EXAMPLES | (a) | (b) | (c) |
|---|---|---|---|
| $T_{QF}(u,v) \neq 0$ BLANKS ARE "0" | 8×8 grid with 1s at positions forming a pattern (see figure) | 8×8 grid with 1s where $u \equiv 0 \pmod 4$ or $v \equiv 0 \pmod 4$ | 8×8 grid filled entirely with 1s |
| JUDGING CONDITION | $(u \equiv 0 \pmod 4$ AND $v \equiv 0 \pmod 2))$ OR $(v \equiv 0 \pmod 4$ AND $u \equiv 0 \pmod 2))$ | $u \equiv 0 \pmod 4$ OR $v \equiv 0 \pmod 4$ | ALWAYS "TRUE" |

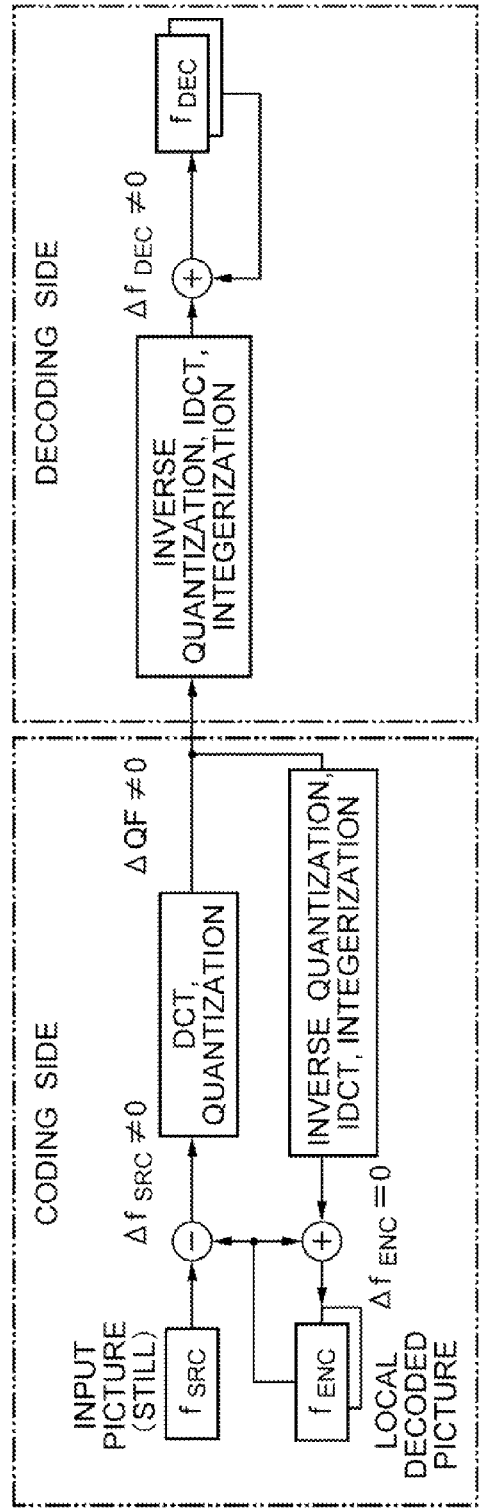
FIG. 11A - PRIOR ART -
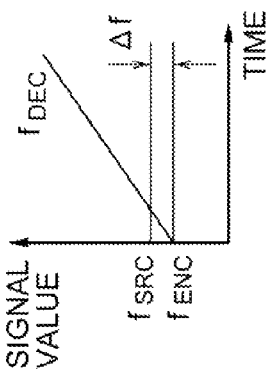
FIG. 11B - PRIOR ART -

MOVING PICTURE DECODING DEVICE, MOVING PICTURE DECODING PROGRAM, AND MOVING PICTURE DECODING METHOD

TECHNICAL FIELD

The present invention relates to a method, a device, and a program for decoding a moving picture stream that is encoded by a standard mode such as MPEG-1, MPEG-2, MPEG-4, H. 261, H. 263, or the like. More specifically, the present invention relates to a moving picture decoding method, device, and program, which prevents excessive accumulations of IDCT mismatch errors generated due to differences in implementation of the IDCT (inverse discrete cosine transform) on an encoding side and a decoding side of a moving picture, and prevents deterioration of a decoded picture.

BACKGROUND ART

For effectively performing compression-encoding of digitized moving picture data, widely used are encoding methods that are combinations of correlation elimination/information compression techniques such as interframe predictive encoding, DCT (discrete cosine transform)/inverse discrete cosine transform, quantization, and variable codeword length encoding. As typical examples, there are MPEG-1, 2, 4 modes which are formatted as standards by ISO/IECJTC1/SC29/WG11 (MPEG), and H. 261, H. 263 modes recommended by ITU-T.

(IDCT Mismatch)

As an issue when transmitting moving pictures by utilizing those standardized encoding modes, there is a problem regarding IDCT mismatch errors generated due to inconsistency between the IDCT used on an encoding side and the IDCT used on a decoding side. These are errors generated because requirements for calculation accuracy of the IDCT used in the standard modes are eased so that implementation of an encoding device and a decoding device does not become more difficult than it is supposed to. Specifically, conditions are defined in Non-Patent Document 1 (there is also a regulation in Annex A of Non-Patent Document 2 for MPEG-4), and IDCT is considered to be in conformity to the standards if measures of a maximum value, an average value, and the like of differences with respect to a reference satisfy the criterions even though the outputs of the real-number reference IDCT are not consistent with the numerical values.

A mismatch error generated in one IDCT calculation is merely "1", and it is so defined that the probability of having an error does not become high. Therefore, an IDCT mismatch generated in one-time picture encoding does not turn out as a big problem. However, when moving picture encoding is conducted by utilizing interframe prediction, mismatch errors generated for each picture are added up and propagated to subsequent pictures. Thus, it is necessary to take a measure so that deterioration of coded pictures due to such error accumulation is not expanded.

A mismatch control is one of the convincing measures. This is a devise for stochastically suppressing generation of output signals that tend to have mismatch errors, through performing signal correction called oddification on input signals in IDCT that is performed when calculating prediction residual signals. The mismatch control has already been employed to the standard encoding modes such as MPEG-2, 4, and the like, and an effect of delaying accumulation of mismatch errors has been achieved.

However, the mismatch control is not a method which can zero the generated errors, so that there is a limit in the effect obtained thereby. Thus, there has been taken a measure which inserts intra-refresh (to cut propagation of errors through conducting intraframe encoding) before the accumulated IDCT mismatch errors become visually conspicuous. Further, with H. 263 mode, there is included a regulation which limits continuation of predictions by conducting intraframe encoding for at least once in 132 pieces of each macro block (Chapter 4.4 of Non-Patent Document 3).

(Problem Regarding Accumulation of Conspicuous IDCT Mismatches Generated in still Scenes)

Noises generated due to the IDCT mismatch errors become conspicuous when still scenes with fewer changes over time are encoded by a small quantization step size. This is because even a small change can be easily detected in a picture where there are only few changes generated as a whole, and noises added to inputted pictures cannot be discarded when the scenes are encoded by a small quantization step size since some kinds of differential signals are encoded constantly and frequency of having mismatch errors generated thereby is increased.

In such conditions, as a phenomenon which particularly causes accumulation of conspicuous IDCT mismatch errors, there is known one condition that is described below. When the encoding side and the decoding side fall into such condition, a fixed IDCT mismatch error is continuously generated in every picture. This fixed IDCT mismatch error is accumulated in a short time, so that an extremely strong noise is included in a decoded picture.

The occurrence state of such problem will be described by referring to FIG. 11A.

An inputted image on the encoding side is perfectly still ($f_{SRC}$ fixed).

The encoding side encodes a quantized coefficient $\Delta QF$ that is obtained by performing DCT and quantization on a difference $\Delta f_{ENC}$ between the inputted image $f_{SRC}$ and a local decoded picture $f_{ENC}$. Since it is a still scene, $\Delta QF$ is small. However, a small value (QP=1, for example) is set for the quantization step size, so that $\Delta QF$ includes an element other than "0". However, since it is extremely a small value, an output $\Delta f_{ENC}$ obtained by performing inverse quantization and IDCT on the inside the encoding side becomes "0" when integerization is performed. As a result, the local decoded picture $f_{ENC}$ on the coded side is not updated.

A prediction residual $\Delta f_{DEC}$ obtained on the decoding side by performing inverse quantization and IDCT does not match with $\Delta f_{ENC}$ of the encoding side because of an IDCT mismatch, and obtained is a signal containing an element (±1) other than "0". Thus, for the picture signals $f_{DEC}$ obtained on the decoding side, signal values change by "1".

When the still scene continues for several seconds in the above conditions, an error in size "1" of a fixed pattern is added for several tens of times on the decoding side, so that signals that are deviated largely from the inputted picture are generated (see graph of FIG. 1B). The strong noise generated in this manner is highly noticeable, which results in deteriorating the quality of the decoded picture.

NOTE 2 of 7.4.4.5 chapter of MPEG-4 is a measure for preventing short-time accumulation of such IDCT mismatch errors. This NOTE restricts actions on the encoding side so that the problematic signals are not contained in a bit stream. The NOTE prohibits output of a signal whose prediction residual $\Delta f_{ENC}$ becomes "0" due to IDCT performed inside the encoding side even through the quantized DCT coefficient ΔQF is other than "0". When the encoding side conforms to this rule and performs processing for replacing the output ΔQF with "0" when the corresponding signal is obtained, such mismatch error problems do not occur.

However, the regulation of NOTE 2 is a rule recommended to the encoding side, and to follow that rule is not defined as a requisite according to MPEG-4. Thus, unless the encoding side takes any measures, it is impossible to prevent generation of this issue completely on the decoding side. This is the same for the cases that use other encoding modes.

FIG. 12 is an illustration showing a typical structure of a moving picture decoding device. In FIG. 12, only the devices which execute inter-type macro block decoding processing related to the present invention are illustrated, and devices for intra-type macro block processing are omitted. This case includes: a decoding device 101 which decodes an inputted bit stream according to a stream description regulation of MPEG-4; an IDCT device 102 which performs 2D IDCT on a decoded DCT coefficient; a prediction picture generating device 104 which generates an interframe prediction picture according to a decoded result; an adding device 103 which obtains a decoded picture by adding a prediction residual after performing IDCT processing to the prediction picture; and a picture storage memory 105 which provides a reference picture used for encoding following pictures. Through proper operations of those, a decoded picture as defined in MPEG-4 can be outputted to the picture storage memory 105.

Note here that 2D IDCT provided to the IDCT device 102 satisfies an accuracy standard that is defined in Annex A of MPEG-4. However, when an encoding device that does not follow a recommended regulation of NOTE 2 of 7.4.4.5 chapter of MPEG-4 inputs an encoded stream of a still scene and some conditions apply, an IDCT mismatch short-time accumulation phenomenon may occur, which results in obtaining a decoded image containing considerable disturbances.

Non-Patent Document 1: "IEEE Std 1180-1990: IEEE Standard Specifications for the Implementation of 8×8 Inverse Discrete Cosine Transform", Dec. 6, 1990, pp. 7-12

Non-Patent Document 2: "ISO/IEC 14496-2: Information Technology Coding of audio visual objects, Part 2 Visual", Jun. 1, 2004, pp. 246, 441-442

Non-Patent Document 3: "ITU-T Recommendation H. 263: Video coding for low bit rate communication", January 2005, pp. 13

DISCLOSURE OF THE INVENTION

Problems to be Solved by the Invention

The IDCT mismatch short-time accumulation phenomenon that may be generated when encoding the still scene as described above generates extremely conspicuous noises in the decoded picture. Thus, there is a high necessity for the measures to be taken to prevent such phenomenon. However, the measure defined in NOTE 2 of 7.4.4.5 chapter of MPEG-4 is incapable of preventing generations of such problem unless the encoding side takes that measure. Moreover, this measure is not defined as essential in the standard. Therefore, it is preferable to have an IDCT mismatch accumulation phenomenon preventing method that can be executed on the decoding side, regardless whether or not there is a measure taken on the encoding side.

It is an object of the present invention to provide a moving picture decoding device and a moving picture decoding program capable of outputting a decoded picture from which accumulated errors are eliminated, even in a case where there is an input of a bit stream that may cause IDCT mismatch short-time accumulation because a small interframe prediction residual is included.

Disclosure of the Invention

In order to achieve the foregoing object, the moving picture decoding device according to the present invention is a device which receives a moving picture bit stream compressed by an encoding device according to a coding method which utilizes interframe prediction and 2-dimensional discrete cosine transform, and generates a decoded picture in a block unit from an interframe prediction picture generated by decoding the bit stream and a prediction residual generated by performing the 2-dimensional inverse discrete cosine transform and integerization processing on a discrete cosine transform coefficient. The moving picture decoding device includes:

a judging device which judges, block-by-block, whether or not it is highly probable that the prediction residual of "0" is obtained by the processing of the 2-dimensional inverse discrete cosine transform and integerization executed by the encoding device when compressing the bit stream; and a selecting device which, based on the judgment result, selects the interframe prediction picture in a case where it is highly probable that the prediction residual of "0" is obtained when compressing the bit stream and selects a picture obtained by adding the prediction residual generated by the decoding device to the interframe prediction picture in other cases, and outputs the selected picture as a decoded picture of the corresponding block.

The moving picture decoding program according to the present invention is a program for receiving a moving picture bit stream compressed by an encoding device according to a coding method which utilizes interframe prediction and 2-dimensional discrete cosine transform, and generating a decoded picture in a block unit from an interframe prediction picture generated by decoding the bit stream and a prediction residual generated by performing the 2-dimensional inverse discrete cosine transform and integerization processing on a discrete cosine transform coefficient. The moving picture decoding program enables a computer to execute:

a function which judges, block-by-block, whether or not it is highly probable that the prediction residual of "0" is obtained by the processing of the 2-dimensional inverse discrete cosine transform and integerization executed by the encoding device when compressing the bit stream; and a function which, based on the judgment result, selects the interframe prediction picture in a case where it is highly probable that the prediction residual of "0" is obtained when compressing the bit stream and selects a picture obtained by adding the prediction residual generated by the decoding device to the interframe prediction picture in other cases, and outputs the selected picture as a decoded picture of the corresponding block.

The moving picture decoding method according to the present invention is a method which receives a moving picture bit stream compressed by an encoding device according to a coding method which utilizes interframe prediction and 2-dimensional discrete cosine transform, and generates a decoded picture in a block unit from an interframe prediction picture generated by decoding the bit stream and a prediction residual generated by performing the 2-dimensional inverse discrete cosine transform and integerization processing on a discrete cosine transform coefficient. The moving picture decoding method includes:

judging, block-by-block, whether or not it is highly probable that the prediction residual of "0" is obtained by the processing of the 2-dimensional inverse discrete cosine transform and integerization executed by the encoding device when compressing the bit stream; and based on the judgment result, selecting the interframe prediction picture in a case where it is highly probable that the prediction residual of "0" is obtained when compressing the bit stream and selecting a picture obtained by adding the prediction residual generated by the decoding device to the interframe prediction picture in other cases, and outputting the selected picture as a decoded picture of the corresponding block.

Effect of the Invention

The present invention detects a small prediction residual signal that may cause short-time accumulation of inverse discrete cosine transform (IDCT) mismatches at the time of decoding a bit stream, and generates a decoded picture while considering the prediction residual for a picture block having a small signal as "0". Therefore, it is possible with the present invention to decode a moving picture that does not have the above-described mismatch accumulation problem.

BEST MODES FOR CARRYING OUT THE INVENTION

Hereinafter, exemplary embodiments of the invention will be described in detail by referring to the drawings.

First, details of the inverse discrete cosine transform (IDCT) mismatch short-time accumulation and the principles of the exemplary embodiments of the invention will be described.

(Details of IDCT Mismatch Short-Time Accumulation)

Occurrence conditions of the IDCT mismatch short-time accumulation phenomenon at the time of encoding a still scene will be analyzed. As shown in FIG. 1, a quantized coefficient of a block unit obtained when a decoding side decodes a bit stream is written as QF(u, v), a signal after inverse quantization as F(u, v), a signal before integerized by performing IDCT as $f_{DEC}(i, j)$, and an output obtained by integerizing the signal as $If_{DEC}(i, j)$. Further, an output before integerization obtained when an encoding side performs IDCT on F(u, v) is written as $f_{ENC}(i, j)$, and an output after integerization as $If_{ENC}(i, j)$.

Note that "(u, v)" indicate the order number (index of frequency) of the discrete cosine transform (DCT). Provided that the processing unit of IDCT is "8×8 pixels", "u" and "v" take a value of 0, 1, - - - , 7, respectively. Further, "(i, j)" show coordinates of a pixel, and "i" and "j" take values of 0, 1, - - - , 7, respectively.

A result obtained by performing reference IDCT of a real-number accuracy on F(u, v) is written as $f_{REF}(i, j)$. In general, $f_{ENC}(i, j)$ and $f_{DEC}(i, j)$ do not match with $f_{REF}(i, j)$, and there is contained a mount error $e_{DEC}(i, j)$ of within a defined range.

Note here that a maximum norm (an absolute value of an element having a maximum size, see Expression 1)//$f_{REF}$//$\infty$ when assuming that $f_{REF}(i, j)$ is an actual vector having 8×8 elements is written as $d_{REF}$. Similarly, maximum norms of $f_{ENC}(i, j)$ and $f_{DEC}(i, j)$ are written as $d_{ENC}$ and $d_{DEC}$.

The mismatch accumulation as the problem occurs when the prediction residual signal decoded for a given picture block continuously satisfies following conditions (1) and (2).
(1) Encoding side IDCT output $If_{ENC}(i, j)=0$ for all (i, j)
(2) Decoding side IDCT output $If_{DEC}(i, j) \neq 0$ for one or more (i, j)

These conditions can be expressed as follows by using the maximum norms mentioned above.

$$d_{ENC}<0.5 \quad (1)$$

$$d_{DEC} \geq 0.5 \quad (2)$$

It can be assumed that both $d_{ENC}$ and $d_{DEC}$ take values close to the reference output norm $d_{REF}$. Thus, it can be found that $d_{REF}$ needs to have a value close to 0.5 when the conditions (1) and (2) apply. When $d_{REF}$ has a value close to 0.5, and a negative mount error is added to $d_{ENC}$ while a positive mount error is added to $d_{DEC}$ so that the conditions (1) and (2) continues to apply, a phenomenon of accumulating IDCT mismatch errors in a short time occurs.

A specific example where such phenomenon occurs will be described. There is considered a case where interframe prediction residual signals satisfying following properties (A), (B), and (C) are coded provided that MPEG-4 Simple Profile is used as a coding method and P-type macro block encoding is performed.
(A) The quantization step size QP=1.
(B) The quantization DCT coefficient QF(u, v) has one non-zero element in (u, v). Elements other than (u, v) are "0".
(C) The value of non-zero element QF(u, v) is "1" or "−1".

FIG. 2 shows a result obtained by calculating $d_{REF}$ for such signals. Since $d_{REF}$ depends on (u, v), values of $d_{REF}$ are shown by having "u" corresponded to the lateral direction and "v" to the longitudinal direction.

When the order number (u, v) of the non-zero element corresponds to diamond marks of FIG. 2, the maximum norm $d_{REF}$ is 0.490, which is slightly smaller than 0.5. With respect to the signal, the reference IDCT (includes integerization) outputs a signal having "0" for all elements. However, depending on the mount state of IDCT, "d≧0.5" applies. In that case, a signal other than "0" is outputted. Thus, when the reference IDCT is used for the encoding side and IDCT which transforms the signals to those other than "0" is used for the decoding side, the mismatch accumulation phenomenon as the problem occurs when a small prediction residual which causes the problem is encoded.

As another pattern, when the order number (u, v) of the non-zero element corresponds to circular marks of FIG. 2, $d_{REF}$ is 0.520. With respect to the signal, the reference IDCT generates prediction residual outputs including non-zero element. However, depending on the mount state of IDCT, "d<0.5" applies. Thus, there may be cases where the output with "0" in all the elements can be obtained. Thus, when such IDCT mount is employed on the encoding side and the reference IDCT is used on the decoding side, the mismatch accumulation phenomenon as the problem may occur.

(Principle of Exemplary Embodiments of the Invention)

From the above analysis, it has been found that the maximum norm d (may be either one of $d_{DEC}$ or $d_{REF}$, which is easier to calculate) of the IDCT output of the prediction residual signals which causes the IDCT mismatch short-time accumulation has a value close to 0.5. Thus, it is possible with the present invention to prevent occurrence of the problem by setting a threshold value $T_d$ including a margin of 0.5 or more and correcting the operations of the moving picture decoding method so that the IDCT result on the decoding side surely becomes "0" for the picture block whose prediction residual is $d \leq T_d$.

As the basic structure, the exemplary embodiments of the invention: performs judgment processing for detecting a small prediction residual within a permissible range that may cause IDCT mismatch short-time accumulation in an IDCT processing block unit during decoding processing; outputs an interframe prediction picture as a decoded picture for a picture block that is judged as small with the permissible range, while considering the residual signal to be "0"; and outputs a picture obtained by adding the prediction residual to the interframe prediction picture as a decoded picture for a picture block that is judged as outside the permissible range. Note here that whether the permissible range is small or not corresponds to whether or not it is highly probable for the "0" prediction residual to be obtained.

Specifically, the moving picture decoding device according to the exemplary embodiment of the invention is a device which receives a moving picture bit stream compressed by an encoding device according to an decoding mode which utilizes interframe prediction and 2-dimensional discrete cosine transform, and generates a decoded picture in a block unit from an interframe prediction picture generated by decoding the bit stream and a prediction residual generated by performing the 2-dimensional inverse discrete cosine transform and integerization processing on a discrete cosine transform coefficient. The moving picture decoding device includes: a judging device which judges, block-by-block, whether or not it is highly probable that the prediction residual of "0" is obtained by the processing of the 2-dimensional inverse discrete cosine transform and integerization executed by the encoding device when compressing the bit stream; and a selecting device which, based on the judgment result, selects the interframe prediction picture in a case where it is highly probable that the prediction residual of "0" is obtained when compressing the bit stream and selects a picture obtained by adding the prediction residual generated by a decoding device to the interframe prediction picture in other cases, and outputs the selected picture as a decoded picture of a corresponding block. This will be described in more details hereinafter.

The judgment regarding smallness of the prediction residual is defined as a judgment which considers a residual, which satisfies the conditional expression $d \leq T_d$ or a necessary condition (necessity is important, but sufficiency is not strongly required) obtained by easing the conditional expression $d \leq T_d$ for easily detecting the corresponding signal, as small.

With the exemplary embodiment of the invention, all the small residuals which cause the problem are replaced with "0". Thus, when the encoding device which generates the stream is in a state shown in FIG. 11, the picture signal obtained on the decoding side is not largely deviated from the coded picture.

Further, decoding processing according to the standard is performed on other blocks having residuals that are not small. Thus, the exemplary embodiment of the invention does not induce another decoding picture error problem for such input of streams that require no measures to be taken.

Practically, there is no problem to be generated as compensations for implementing the effect. However, there is such a concern that a decoded picture different from a standard definition may be obtained for the block that has the prediction residual replaced with "0" because it is small. Nonetheless, such errors do not turn out as the problem because of the following reasons, as long as the detection condition is limited to a small range.

A probability of continuously generating the corresponding small signal other than in the still scene is low.

The error generated in the decoded picture by considering the small prediction residual as "0" in the still scene is so small that it can be ignored. Depending on the cases, normal IDCT mismatch (different from the short-time accumulation) may be lightened.

(Specific Example of Prediction Residual Smallness Judgment Condition)

Examples of Conditional Expression effective for detecting the prediction residual which may cause IDCT mismatch short-time accumulation will be presented. As the most basic condition, there is Conditional Expression 1 which conducts a judgment according to the maximum norm d of f(i, j) (f is either $f_{REF}$ or $f_{DEC}$) described above.

$$d \leq T_d \qquad \text{Conditional Expression 1}$$

Next, there is considered a method which judges it with a signal F(i, 1) before performing IDCT. In general, it is not possible to find a conditional expression that is equivalent to Conditional Expression 1. Therefore, a judgment is conducted by calculating K-number (K is an integer of 1 or larger) of evaluation measures in size F as in Conditional Expression 2, and by judging whether or not a set (D1, D2, - - -, DK) of calculated measures are contained in a set $R_D$. As examples of the measures for evaluating the size of F, the maximum norm (Expression 1), p-th power norm defined for a positive actual number p (Expression 2), or the number "n" of the non-zero element contained in F may be used. The set $R_D$ is so set to include the signals satisfying the conditional Expression 1 as many as possible.

$$(D1, D2, \text{- - -}, DK) \in R_D \qquad \text{Conditional Expression 2}$$

$$\|F\|_\infty = \max_{(u,v)} |F(u, v)| \qquad \text{[Equation 1]}$$

$$\|F\|_p = \left( \sum_{(u,v)} |(u, v)|^p \right)^{1/p} \qquad \text{[Equation 2]}$$

In the cases where uniform quantization is performed or a default matrix is used with MPEG-4, the number "n" of the non-zero element in the signal satisfying the condition 1 may be limited to 1 or less in some cases. In that case, as a way of example, a judgment is conducted according to "n" and the size of the non-zero element F. A threshold value $T_F$ regarding F may be determined according to the order number (u, v) of the non-zero element, for example. Alternatively, it is also another method to set a slightly larger value irrespective of (u, v).

At last, there is a method for judging the smallness not with the DCT coefficient after the quantization but with the coefficient QF before the inverse quantization. For example, Conditional Expression 4 is an expression like Conditional Expression 2 which is satisfied by the K-number of measures (D1', D2', - - -, DK'), and an appropriate set is set as a set $R_D'(QP)$ according to the quantization step size QP. When the step QP is large, the corresponding small signal may not be contained. Therefore, this judgment is conducted with $QP \leq T_{QP}$. Similarly, Conditional Expression 5 is an expression which is corrected to refer to QF for a judgment based on Conditional Expression 3.

$$n=0 \text{ OR } (n=1 \text{ AND } |F| \leq T_F(u,v)) \qquad \text{Conditional Expression 3}$$

$$QP \leq T_{QP} \text{ AND } (D1', D2', \text{- - -}, DK') \in R_D'(QP) \qquad \text{Conditional Expression 4}$$

$$QP \leq T_{QP} \text{ AND } (n=0 \text{ OR}(n=1 \text{ AND } |QF| \leq T_{QF}(u,v,QP)) \qquad \text{Conditional Expression 5}$$

Through judging the detection of the small prediction residual by using above-described Conditional Expression 1 showing the necessary condition for the IDCT mismatches to be accumulated in a short time or by using Conditional Expressions 2-5 which show that condition approximately, the mismatch accumulation preventing effect as in the exemplary embodiment of the invention can be obtained. Further, Conditional Expressions 3 and 5 do not require calculation of norms, so that the amount of calculations required for the judgment can be suppressed. Conditional Expressions 4 and 5 are capable of reducing the amount of calculations required for the judgments in many cases, since the judgment processing may be executed only when QP is small.

Next, the specific example of the embodiment of the present invention will be described in more details.

(Matters Common to All Exemplary Embodiments Described Hereinafter)

First, the matters in common to all the exemplary embodiments will be described. The exemplary embodiments of the invention are structured to select an interframe prediction picture obtained based on interframe prediction such as motion compensation or the like or a picture obtained by adding a prediction residual calculated by 2D IDCT to the interframe prediction picture, and output the selected picture as a decoded picture. As moving pictures dealt with the exemplary embodiments of the invention, moving pictures of standard modes such as MPEG-1, 2, 4, H. 261, H. 263, etc. may be considered as those pictures. As a way of example, described herein is a moving picture decoding device that is obtained by applying the exemplary embodiments of the invention to decoding processing of a bit stream that is coded with MPEG-4 mode.

FIG. 3 is a schematic illustration showing the moving picture decoding device obtained by applying the exemplary embodiments of the invention. Note here that processing devices 101-105 provided to the device according to the exemplary embodiments perform same operations as those of the processing devices 101-105 shown in FIG. 12. In addition to those, the exemplary embodiments include: a judging device 106 which judges whether the prediction residual of the block that is being decoded is small or not based on the inputted bit stream, a decoded result thereof, or an intermediate signal obtained by a calculation of 2D IDCT; and a selecting device 107 which selects an interframe prediction picture or a picture obtained by adding the prediction residual to the interframe prediction picture according to the judge result, and outputs the selected picture as a picture signal outputted to the picture storage memory 105.

Smallness judgment processing and selecting processing of the decoded picture executed by the judging device 106 and the selecting device 107 is executed by a unit block of IDCT calculation. The unit block is a luminance signal or a chromatic signal of 8×8 pixels in the exemplary embodiments which use MPEG-4. When the judging device 106 judges that the prediction residual signal of the block that is being processed is small, the selecting device 107 outputs, to the picture storage device 105, the decoded picture obtained by replacing the prediction residual with "0", i.e., an interframe prediction picture. When judged that the prediction residual signal is not small, the selecting device 107 outputs a picture that is obtained by decoding according to the standards outputted by the prediction picture generating device 104.

This operation of the decoding device corresponds to obtaining a decoded picture by treating the small prediction residual that is highly probable to cause the problematic IDCT mismatch accumulation as "0". As described above, this provides an effect of preventing occurrence of the mismatch short-time accumulation phenomenon.

In a case where all the DCT coefficients obtained by decoding of the above-described operation are "0" and there is not even one non-zero element, the results are the same whether the prediction picture is outputted as it is by the selecting device 107 or the prediction residual obtained by IDCT is added to the prediction picture. Therefore, regarding such block processing, the devices may be operated in such a manner that the prediction picture is selected and outputted from the selecting device 107 by functionalizing the IDCT device 102 and the judging device 106. Alternatively, it is also one of the exemplary embodiments to stop the IDCT device 102 and the judging device 106 and output the prediction picture unconditionally.

Details of the judging processing executed by the judging device 106 are different in each exemplary embodiment, so that the details thereof will be described individually. For treating the block having "0" for all the coefficients, explanations will be provided while assuming a case of a mount method which stops the judging device 106 for simplifying the explanations. Therefore, in the explanations of the operations of the judging device 106, it is assumed that the picture block that is being processed includes one or more non-zero DCT coefficient or non-zero quantized coefficient.

First Exemplary Embodiment

FIG. 4 shows the details of the judging device 106 according to the first exemplary embodiment. The judging device 106 includes, within itself, a norm calculating device 108 for calculating norm d from IDCT output signals before the integerization and a threshold value judging device 109 for comparing "d" with the threshold value $T_d$. It is assumed that the norm d is the maximum norm (the maximum value of the absolute values of the signals within the block).

FIG. 5 shows operations of the judging device 106. The judgment is conducted by every IDCT unit block of 8×8 pixels. The judging device 106 inputs the quantization step size QP and the IDCT output f(i, j) before the integerization from the decoding device 101 and the IDCT device 102 (S501). The judging device 106 performs the smallness judgment only when the quantization step size QP is equal to or less than the threshold value $T_{QP}$. Thus, the judging device 106 executes comparing processing in S502. When the result thereof is QP>$T_{QP}$, the judging device 106 skips the judgments thereafter and proceeds to processing of S506.

When the result thereof is QP≦$T_{QP}$, the judging device 106 calculates the norm d of the IDCT output (S503), and then compares "d" with the threshold value $T_d$(S504). When the result thereof is d≦$T_d$, the judging device 106 shifts the processing to S505, and sends a signal to the selecting device 107 for selecting and outputting the prediction picture as a decoded picture. When the result thereof is d>$T_d$, the judging device 106 shifts the processing to S506, and sends a selection signal to the selecting device 107 for outputting a normal decoded picture to which the prediction residual is added.

For the threshold value $T_d$ as a reference for the judging device 106 to make judgments, it is preferable to set 0.5 or a value obtained by adding an IDCT error margin to 0.5 such as 0.6. When a larger value than that is set for $T_d$, the capacity for detecting the picture block that induces the problem can be improved. Thus, it is possible to prevent generation of the mismatch short-time accumulation for the bit stream that is generated by an encoding device whose IDCT accuracy is poor. In the meantime, when an extremely large value is set for $T_d$, another decoding error problem may occur. Therefore, it is preferable to set the value of $T_d$ within a range of merely 1 or less in a well balanced manner.

The values to be set for the threshold value $T_{QP}$ vary depending on the characteristics of quantization used for encoding (two kinds are defined in MPEG-4, i.e., uniform quantization and quantization using matrix). "$T_{QP}$=1" is preferable for the case where the uniform quantization is selected. Except for special cases, the number of picture blocks compression-coded in a small quantization step size, such as QP=1, is normally small, so that it is possible to suppress the processing time and power consumption required for calculation of the norm d.

In the meantime, when the matrix-type quantization is selected, it is preferable to set the maximum QP with which the condition $d \leq T_d$ can be generated in accordance with the state. It is one of the exemplary embodiments to calculate the corresponding QP from the set quantization matrix. Alternatively, the possible maximum QP from the restriction of the standards may be fixed. It is also another method to set $T_{QP}=1$ only in a case of a default matrix. Through those settings, the amount of calculations increased by performing the present invention can be decreased even though the effect thereof is limited than the case of the uniform quantization.

Second Exemplary Embodiment

FIG. 6 shows operations of the judging device 106 according to a second exemplary embodiment.

The judging device 106 acquires the quantization step size QP of the block that is being processed from the decoding device 101, the number $n(\geq 1)$ of the non-zero DCT coefficients, and values F of the non-zero DCT coefficients, and if n=1, acquires the order number (u, v) of the non-zero DCT coefficient (S601). The judging device 106 performs a judgment on the threshold value of the quantization step size QP (S602). When the result thereof is QP>$T_{QP}$, the judging device 106 skips the judgments thereafter, and shifts the processing to S607.

When QP$\leq T_{QP}$, the judging device 106 compares the number n of the non-zero DCT coefficient with "1" (S603). When n$\leq$1, the judging device 106 obtains the threshold value $T_F$(u, v) from a table and compares it with F (S604, S605). When $|F| \leq T_F$(u, v) applies, the judging device 106 shifts the processing to S606, and sends an appropriate selection signal for outputting a prediction picture to the selecting device 107. When any of the conditions does not apply, the judging device 106 shifts the processing to S607 to send, to the selecting device 107, a selection signal for outputting a signal obtained by adding a prediction residual as a decoded picture.

The values preferable to be set for the threshold value $T_{QP}$ are the same as those of the first exemplary embodiment, so that explanations thereof are omitted. Through setting the appropriate values, the amount of arithmetic operations for embodying the present invention can be reduced.

For $T_F$(u, v), it is preferable to set a boundary condition value that the size of L is to satisfy for the result d calculated as the maximum norm to be equal to or less than the threshold value $T_d$ for the IDCT signal that can be obtained by transforming the DCT coefficient having the non-zero coefficient of value L as (u, v). Note here that the threshold value $T_d$ is a value obtained by adding the IDCT mount error margin to 0.5 as in the case of the first exemplary embodiment described above. FIG. 7 shows the result obtained by calculating such $T_F$(u, v) assuming that $T_d$=0.6. Values vary depending on (u, v), so that it is illustrated in a table of 8×8, in which the lateral axis corresponds to values of "u" and the longitudinal axis corresponds to values of "v". Through setting such $T_F$(u, v) and performing the smallness judgment, the DCT signal that induces the IDCT mismatch accumulation phenomenon can be detected surely so as to prevent generation of the problem. Further, the signal of d>$T_d$ is not to be judged as small, so that there is no risk of having such an unfavorable side effect that the signals other than the corresponding signal are detected and that the errors are increased at the time of decoding.

As another setting example, it is also one of the exemplary embodiments to set a uniform value $T_F$ for $T_F$(u, v) which does not depend on (u, v). In this case, it is effective to set the maximum value 4.80 of FIG. 9 to TF. Since the number of signal patterns judged as small is increased, there is a slight risk of having a decoding error. However, short-time accumulation of extremely conspicuous mismatches can be prevented surely. Further, the table for storing $T_F$(u, v) becomes unnecessary, so that the present invention can be embodied easily.

Third Exemplary Embodiment

FIG. 8 shows operations of the judging device 106 according to a third exemplary embodiment. The operations of the judging device 106 are almost the same as the operations of the judging device 106 according to the second exemplary embodiment described in FIG. 6, so that only the different points of the operations will be described.

The difference with respect to the second exemplary embodiment is that the judging device 106 of the third exemplary embodiment compares the coefficient QF before inverse quantization with the threshold value $T_{QF}$(u, v, QF) to perform a smallness judgment (S805) whereas the judging device 106 of the second exemplary embodiment compares the DCT coefficient F after the inverse quantization with the threshold value $T_F$(u, v) to perform a smallness judgment (S604, S605). This is the point that is different from the second exemplary embodiment. The threshold value $T_{QF}$(u, v, QF) generally depends on the quantization step size. However, since TQP=1 in this case, there is considered a case where the threshold value $T_{QF}$(u, v, QF) is referred only when QP=1. Thus, this is written as $T_{QF}$(u, v) in the explanations of this exemplary embodiment.

Preferable set values of $T_{QF}$(u, v) in the exemplary embodiment are shown in setting examples (a), (b), and (c) of FIG. 9. As in the case of the second exemplary embodiment, these are obtained by transforming the condition with which the maximum norm d of the signal after IDCT becomes equal to or less than the threshold value $T_d$ into a condition for the signal before quantization (QP=1, and the quantization type is uniform quantization), and (a), (b) are the results obtained under a condition where $T_d$=0.5, $T_d$=0.53, and (c) is a set value for performing judgments regardless of (u, v). Through such settings done by the judging device 106, the effect of preventing the IDCT mismatch error short-time accumulation phenomenon can be achieved as in the case of the second exemplary embodiment.

In general, it is fine to set values of "2" or larger for $T_{QF}$(u, v) to make judgments. However, when the value of $T_{QF}$(u, v) is limited to "0" or "1" as in the case of FIG. 9, implementation becomes possible without using the table. For example, FIG. 10 shows an example of implementation when the setting example (b) of FIG. 9 is used for $T_{QF}$(u, v).

The both are equivalent except that judging processing S804 and the judging processing S805 in the operations shown in FIG. 8 are replaced with S1004 and S1005 in FIG. 10. Instead of omitting the table-referring processing, judgment S1004 excluding the case of QP>1 and S1005 for judging whether or not it is (u, v) which satisfies $T_{QF}$(u, v)=1 are executed. Even though it depends on the exemplary embodiments, circuits for referring to the table and command descriptions of a program are reduced. Therefore, it is possible to suppress increases in the processing time and the circuit scale which may otherwise be increased for embodying the present invention.

In the cases where the setting examples (a) and (c) of FIG. 9 are used, the present invention can be embodied in the same manner by replacing the judging condition of S1205 with the condition written in the third column of FIG. 9. Particularly, the case of using the setting example (c) of FIG. 9 does not require a judgment of S1005, so that the exemplary embodiment becomes still easier.

As described above, the exemplary embodiment of the invention detects the small prediction residual signal which may cause IDCT mismatch short-time accumulation at the time of decoding the bit stream, and generates a decoded picture by considering the prediction residual as "0" for the picture block having the small signal. Therefore, it is possible to achieve decoding of moving pictures without causing the mismatch accumulation problem. By setting the threshold values used for the smallness judgment condition within an appropriate range, generation of the errors that may occur when the stream having no problem is decoded can also be suppressed to minimum.

Further, the exemplary embodiment of the invention can be implemented only with a devise in the decoding processing executed on the decoding side. This means that the exemplary embodiment of the invention can be applied easily when inputting and decoding a bit stream that is generated by using a moving picture encoding device conforming to a typical encoding standard.

In the exemplary embodiment of the invention, the detection judgment of the residual signal which is so small that a problem may be generated is executed only when the quantization step size QP does not exceed the threshold value. This reduces the probability of executing the judging processing, so that the amount of arithmetic operation increased for embodying the present invention can be suppressed to a small amount. Further, the present invention executes the detecting processing of the small prediction residual not by using the quantization parameter QP, the number, value, order number of the non-zero DCT coefficients, or the DCT coefficient, but with a similar judgment using the quantized coefficient. Compared to the method for performing the smallness judgment by calculating the IDCT output norm, this method requires no calculation of the norm. Therefore, the load of calculations required for embodying the present invention can be lightened.

In the explanations above, the judging device 106 and the selecting device 107 are built as hardware. However, the present invention is not limited only to such case. Functions executed by the judging device 106 and the selecting device 107 may be built on software through having a computer execute a moving picture decoding program.

The moving picture decoding program according to the exemplary embodiment of the invention for building the judging device 106 and the selecting device 7 of the first exemplary embodiment of the invention on software is a program which receives a moving picture bit stream compressed by a coding method which utilizes interframe prediction and 2-dimensional discrete cosine transform, and decodes the bit stream to a decoded picture. The moving picture decoding program is built as a structure which enables a computer to execute:

a function which judges a block unit prediction residual generated by performing 2-dimensional inverse discrete cosine transform on a discrete cosine transform coefficient; and a function which selects, based on the judgment result of the prediction residual, an interframe prediction picture or a picture obtained by adding the prediction residual to the interframe prediction picture, and outputs the selected picture as a decoded picture.

It is also possible to enable the computer to execute a function which outputs, as the decoded picture, the interframe prediction picture while considering the prediction residual as "0" for the block whose prediction residual is judged to be within a permissible range, and outputs, as the decoded picture, a picture that is obtained by adding the prediction residual to the interframe prediction picture for the block whose prediction residual is judged to be outside the permissible range.

It is also possible to enable the computer to execute a function which judges a prediction residual of a block whose maximum norm calculated from an output signal obtained by inverse discrete cosine transform before integerization is equal to or less than a threshold value to be within the permissible range.

It is also possible to enable the computer to execute a function which judges a prediction residual of the block whose set of one or more kinds of measures, i.e., norms calculated from discrete cosine transform coefficients or number of non-zero elements, is included in a prescribed set including "0" as the permissible range.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

A moving picture decoding method according to another exemplary embodiment of the invention is a moving picture decoding method which receives a moving picture bit stream compressed by an decoding mode which utilizes interframe prediction and 2D DCT, and generates a decoded picture from an interframe prediction picture generated based on information obtained by decoding the bit stream and a result obtained by adding block-unit prediction residuals generated by performing 2D IDCT on DCT coefficients. The moving picture decoding method may be structured to judge whether or not the prediction residuals are small; and outputs, as a decoded picture, an interframe prediction picture for the block whose prediction residual is judged as small as the judgment result, and outputs, as the decoded picture, an image obtained by adding the prediction residual to the interframe prediction picture for other blocks.

The moving picture decoding method may be structured to replace the prediction residual with "0" and output the interframe prediction picture as the decoded picture for the block whose prediction residual is judged as small, and output, as the decoded picture, an image obtained by adding the prediction residual to the interframe prediction picture for other blocks.

The moving picture decoding method may be structured to judge the prediction residual of the block whose maximum norm calculated from an IDCT output signal before integerization is equal to or less than a threshold value as small, and the threshold value is 0.5 or higher.

The moving picture decoding method may be structured to judge the prediction residual of the block whose set of one or more kinds of measures, i.e., norms calculated from the DCT coefficients or number of non-zero elements, is included in a prescribed set as small.

The moving picture decoding method may be structured to judge the prediction residual of the block whose number of non-zero elements contained in the DCT coefficient is "1" and the size of the non-zero element is equal to or smaller than a first threshold value as small.

It is desirable for the first threshold value to be set for each order number of the non-zero element in such a manner that the maximum norm of the 2D IDCT output generated from the corresponding DCT coefficient becomes equal to or less than a second threshold value.

It is desirable for the first threshold value to be "1" or set to be "1" at all times so that all the DCT coefficients that can obtain the 2D IDCT output whose maximum norm is equal to or less than the second threshold value are judged as small.

The moving picture decoding method may be structured to find the DCT coefficients by performing inverse quantization of the quantized coefficients obtained from the bit stream, and to omit the judgment for the block whose quantized coefficient is larger than a third threshold value.

The moving picture decoding method may be structured to find the DCT coefficients by performing inverse quantization of the quantized coefficients obtained from the bit stream, and to judge the prediction residual of the block whose set of one or more kinds of measures, i.e., norm regarding the quantized coefficients or number of the non-zero elements, is within a range that is set in accordance with the quantization step size as small.

The moving picture decoding method may be structured to find the DCT coefficients by performing inverse quantization of the quantized coefficients obtained from the bit stream, and to judge the prediction residual of the block whose quantization step size is equal to or smaller than the third threshold value, the number of non-zero element is "1" or less, and size of the non-zero element is equal to or smaller than a fourth threshold value as small, and to judge other blocks as being not small.

It is desirable for the third threshold value to be "1", and for the fourth threshold value to be set to a fixed value.

When the block size is of 8×8, it is desirable for the fourth threshold value to be "1" in a case where the order number of the non-zero element is (0, 0), (1, 0), (2, 0), (3, 0), (4, 0), (5, 0), (6, 0), (7, 0), (0, 1), (4, 1), (0, 2), (4, 2), (0, 3), (4, 3), (0, 4), (1, 4), (2, 4), (3, 4), (4, 4), (5, 4), (6, 4), (7, 4), (0, 5), (4, 5), (0, 6), (4, 6), (0, 7), or (4, 7) and desirable to be "0" in other cases.

When the block size is of 8×8, it is desirable for the fourth threshold value to be "1" in a case where the order number of the non-zero element is (0, 0), (2, 0), (4, 0), (6, 0), (0, 2), (4, 2), (0, 4), (2, 4), (4, 4), (6, 4), (0, 6), or (4, 6), and desirable to be "0" in other cases.

It is desirable to omit the judgment of the prediction residual for the block whose prediction residual becomes "0" when the IDCT output is integerized, and to select the interframe prediction picture as the decoded picture.

A moving picture decoding device according to another exemplary embodiment of the invention is a moving picture decoding device which receives a moving picture bit stream compressed by a coding method which utilizes interframe prediction and 2D DCT, and generates a decoded picture from an interframe prediction picture generated based on information obtained by decoding the bit stream and a result obtained by adding block-unit prediction residuals generated by performing 2D IDCT on DCT coefficients. The moving picture decoding device may be structured to include: a judging device for judging whether or not the prediction residuals are small; and a selecting device which selects, as a decoded picture, an interframe prediction picture for the block whose prediction residual is judged as small by the judging device, and obtains, as the decoded picture, an image obtained by adding the prediction residual to the interframe prediction picture for other blocks.

The selecting device may be structured to replace the prediction residual with "0" and to output the interframe prediction picture as the decoded picture for the block whose prediction residual is judged as small, and to output, as the decoded picture, an image obtained by adding the prediction residual to the interframe prediction picture for other blocks.

The judging device may be structured to judge the prediction residual of the block whose maximum norm calculated from an IDCT output signal before integerization is equal to or less than a threshold value as small, and the threshold value is 0.5 or higher.

The judging device may be structured to judge the prediction residual of the block whose set of one or more kinds of measures, i.e., norms calculated from the DCT coefficients or number of non-zero elements, is included in a prescribed set as small.

The judging device may be structured to judge the prediction residual of the block whose number of non-zero element contained in the DCT coefficient is "1" and the size of the non-zero element is equal to or smaller than a first threshold value as small.

It is desirable for the first threshold value to be set for each order number of the non-zero element in such a manner that the maximum norm of the 2D IDCT output generated from the corresponding DCT coefficient becomes equal to or less than a second threshold value.

It is desirable for the first threshold value to be "1" or set to be "1" at all times so that all the DCT coefficients that can obtain the 2D IDCT output whose maximum norm is equal to or less than the second threshold value are judged as small.

It is also possible to find the DCT coefficients by performing inverse quantization of the quantized coefficients obtained from the bit stream, and the judging device may be structured to omit the judgment for the block whose quantized coefficient is larger than a third threshold value.

It is also possible to find the DCT coefficients by performing inverse quantization of quantized coefficients obtained from the bit stream, and the judging device may be structured to judge the prediction residual of the block whose set of one or more kinds of measures, i.e., norm regarding the quantized coefficients or a number of the non-zero elements, is within a range that is set in accordance with the quantization step size as small.

It is also possible to find the DCT coefficients by performing inverse quantization of quantized coefficients obtained from the bit stream, and the judging device may be structured to judge the prediction residual of the block whose quantization step size is equal to or smaller than the third threshold value, the number of non-zero element is "1" or less, and size of the non-zero element is equal to or smaller than a fourth threshold value as small, and to judge other blocks as being not small.

It is desirable for the third threshold value to be "1", and for the fourth threshold value to be set to a fixed value.

When the block size is of 8×8, it is desirable for the fourth threshold value to be "1" in a case where the order number of the non-zero element is (0, 0), (1, 0), (2, 0), (3, 0), (4, 0), (5, 0), (6, 0), (7, 0), (0, 1), (4, 1), (0, 2), (4, 2), (0, 3), (4, 3), (0, 4), (1, 4), (2, 4), (3, 4), (4, 4), (5, 4), (6, 4), (7, 4), (0, 5), (4, 5), (0, 6), (4, 6), (0, 7), or (4, 7) and desirable to be "0" in other cases.

When the block size is of 8×8, it is desirable for the fourth threshold value to be "1" in a case where the order number of the non-zero element is (0, 0), (2, 0), (4, 0), (6, 0), (0, 2), (4, 2), (0, 4), (2, 4), (4, 4), (6, 4), (0, 6), or (4, 6), and desirable to be "0" in other cases.

It is desirable to omit the judgment of the prediction residual for the block whose prediction residual becomes "0" when the IDCT output is integerized, and to select the interframe prediction picture as the decoded picture.

A moving picture decoding program according to another exemplary embodiment of the invention is a moving picture decoding program which receives a moving picture bit stream compressed by a coding method which utilizes interframe prediction and 2D DCT, and generates a decoded picture from an interframe prediction picture generated based on information obtained by decoding the bit stream and a result obtained by adding block-unit prediction residuals generated by performing 2D IDCT on DCT coefficients. The moving picture decoding program may be structured to enable a computer to execute: judging processing for judging whether or not the prediction residuals are small; and a selecting processing which selects, as a decoded picture, an interframe prediction picture for the block whose prediction residual is judged as small by the judging processing, and obtains, as the decoded picture, an image obtained by adding the prediction residual to the interframe prediction picture for other blocks.

The moving picture decoding program may be so structured that the selecting processing replaces the prediction residual with "0" and outputs the interframe prediction picture as the decoded picture for the block whose prediction residual is judged as small, and outputs, as the decoded picture, an image obtained by adding the prediction residual to the interframe prediction picture for other blocks.

It is desirable for the judging processing to judge prediction residual of the block whose maximum norm calculated from an IDCT output signal before integerization is equal to or less than a threshold value as small, and desirable for the threshold value to be 0.5 or higher.

It is desirable for the judging processing to judge the prediction residual of the block whose set of one or more kinds of measures, i.e., norms calculated from the DCT coefficients or number of non-zero elements, is included in a prescribed set as small.

It is desirable for the judging processing to judge the prediction residual of the block whose number of non-zero elements contained in the DCT coefficient is "1" and the size of the non-zero element is equal to or smaller than a first threshold value as small.

It is desirable for the first threshold value to be set for each order number of the non-zero element in such a manner that the maximum norm of the 2D IDCT output generated from the corresponding DCT coefficient becomes equal to or less than a second threshold value.

It is desirable for the first threshold value to be "1" or set to be "1" at all times so that all the DCT coefficients that can obtain the 2D IDCT output whose maximum norm is equal to or less than the second threshold value are judged as small.

It is desirable to find the DCT coefficients by performing inverse quantization of quantized coefficients obtained from the bit stream, and, in the judging processing, to omit the judgment for the block whose quantized coefficient is larger than a third threshold value, and output, as the decoded picture, an image obtained by adding the prediction residual to the interframe prediction picture.

It is desirable to find the DCT coefficients by performing inverse quantization of quantized coefficients obtained from the bit stream, and to judge the prediction residual of the block whose set of one or more kinds of measures, i.e., norm regarding the quantization coefficient or number of the non-zero elements, is within a range that is set in accordance with the quantization step size as small in the judging processing.

It is desirable to find the DCT coefficients by performing inverse quantization of quantized coefficients obtained from the bit stream, and to judge the prediction residual of the block whose quantization step size is equal to or smaller than the third threshold value, the number of non-zero element is "1" or less, and size of the non-zero element is equal to or smaller than a fourth threshold value as small, and to judge other blocks as being not small, in the judging processing.

It is desirable for the third threshold value to be "1", and for the fourth threshold value to be "1" or to be always "1".

When the block size is of 8×8, it is desirable for the fourth threshold value to be "1" in a case where the order number of the non-zero element is (0, 0), (1, 0), (2, 0), (3, 0), (4, 0), (5, 0), (6, 0), (7, 0), (0, 1), (4, 1), (0, 2), (4, 2), (0, 3), (4, 3), (0, 4), (1, 4), (2, 4), (3, 4), (4, 4), (5, 4), (6, 4), (7, 4), (0, 5), (4, 5), (0, 6), (4, 6), (0, 7), or (4, 7) and desirable to be "0" in other cases.

When the block size is of 8×8, it is desirable for the fourth threshold value to be "1" in a case where the order number of the non-zero element is (0, 0), (2, 0), (4, 0), (6, 0), (0, 2), (4, 2), (0, 4), (2, 4), (4, 4), (6, 4), (0, 6), or (4, 6), and desirable to be "0" in other cases.

It is desirable to omit the judgment of the prediction residual for the block whose prediction residual becomes "0" when the IDCT output is integerized, and to select the interframe prediction picture as the decoded picture.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

This Application is the National Phase of PCT/JP2008/057897, filed Apr. 24, 2008, which claims the Priority right based on Japanese Patent Application No. 2007-117141 filed on Apr. 26, 2007, and the disclosure thereof is hereby incorporated by reference in its entirety.

BRIEF DESCRIPTION OF THE DRAWINGS

FIG. 2 is an illustration showing maximum norms obtained as a result of applying IDCT for DCT coefficients having single non-zero signal of level ±1, in moving picture decoding processing (QP=1, and uniform quantization is used) according to MPEG-4 standard mode;

FIG. 7 is an illustration showing setting examples of a judgment threshold value $T_F(u, v)$ according to the second exemplary embodiment of the invention;

FIG. 9 is an illustration showing setting examples of a judgment threshold value $T_{QF}(u, v)$ according to the second exemplary embodiment of the invention;

FIG. 11A and FIG. 11B are illustrations for schematically describing a phenomenon in which IDCT mismatch errors are accumulated in a short time when encoding a still scene.

REFERENCE NUMERALS

Figure 1:
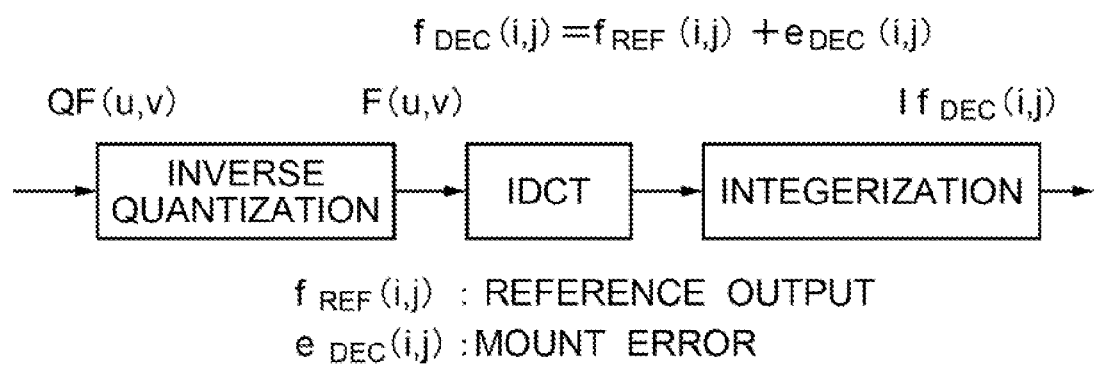
FIG. 1 is an illustration showing corresponding relations between numerical expressions and an intermediate signal obtained when decoding a moving picture.
Figure 3:
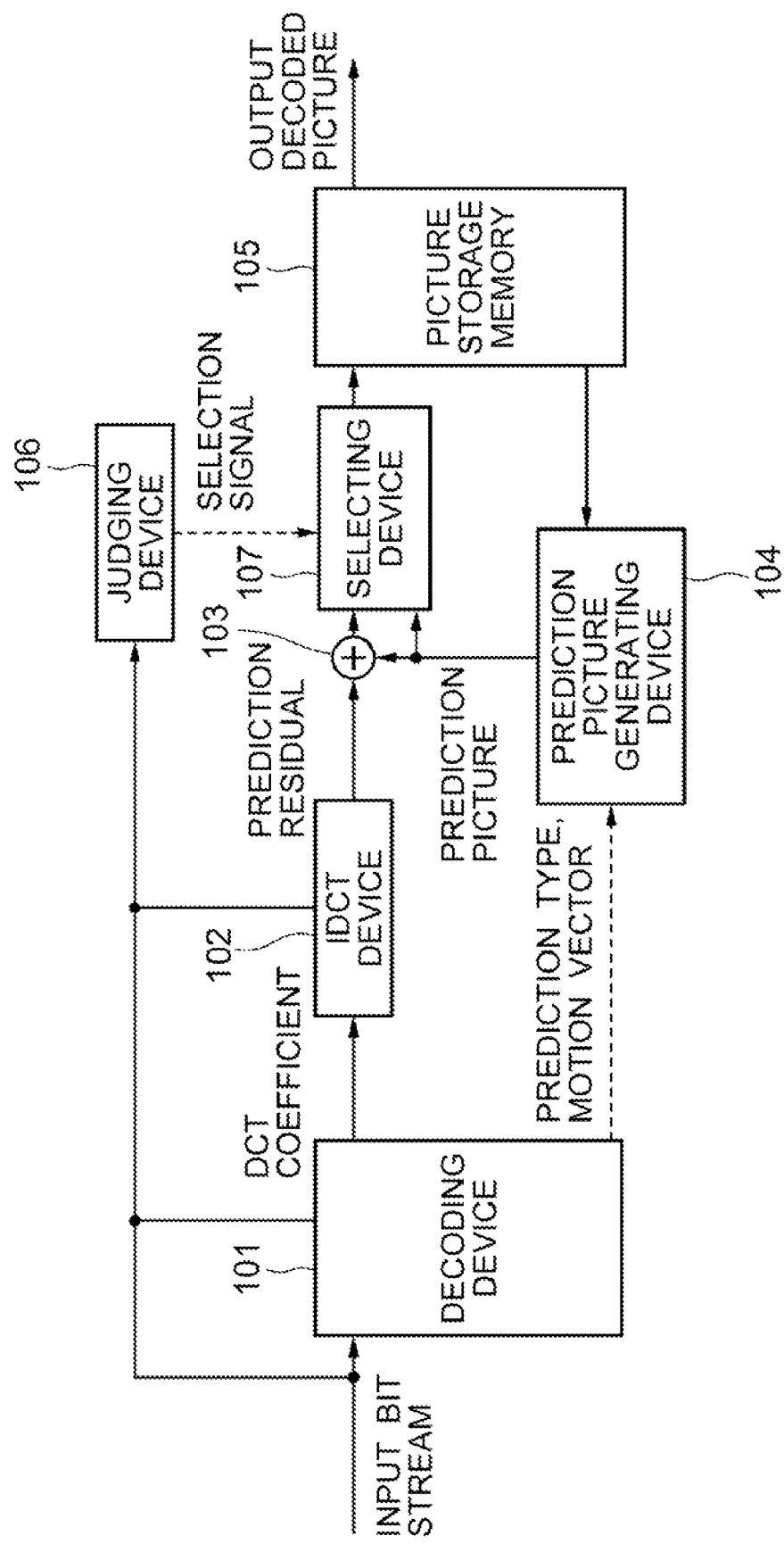
FIG. 3 is an illustration showing a structure of a moving picture decoding device of the present invention.
Figure 4:
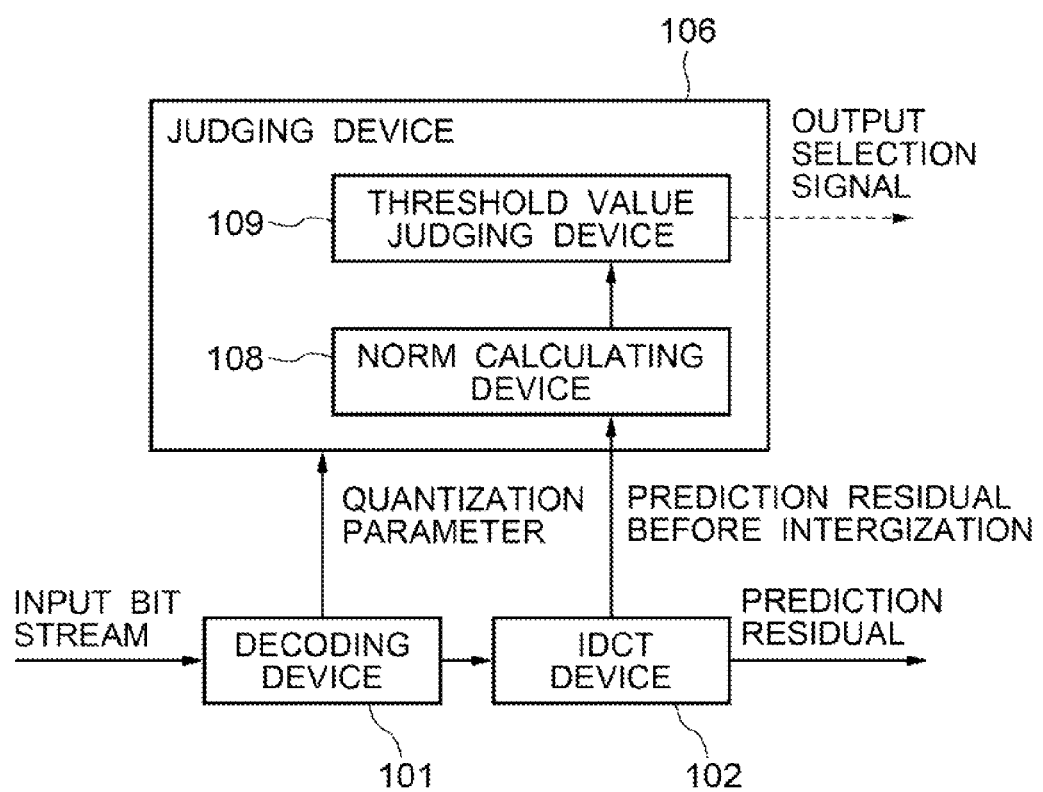
FIG. 4 is an illustration showing a structure of a judging device according to a first exemplary embodiment of the invention.
Figure 5:
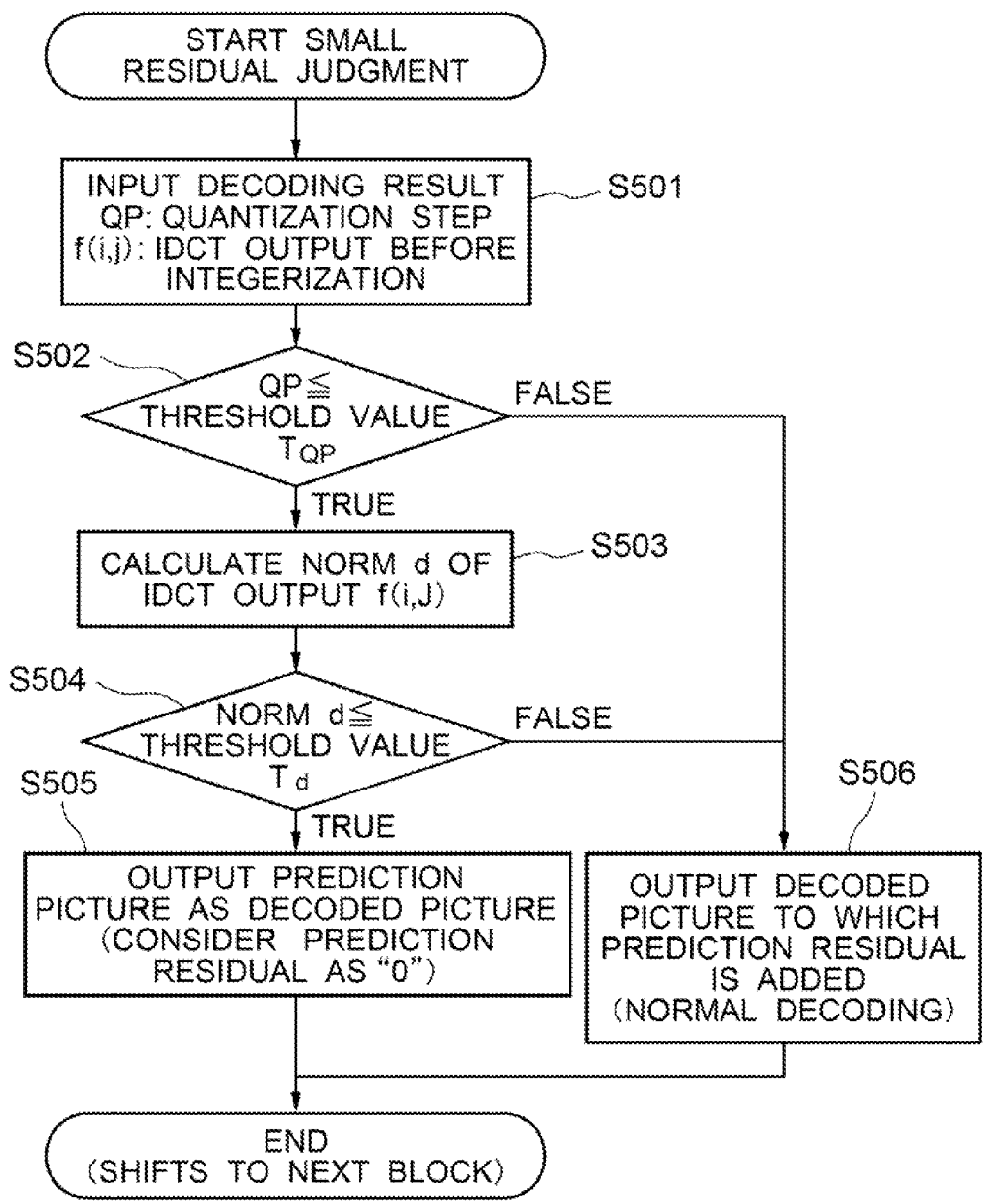
FIG. 5 is an illustration showing operations of the judging device according to the first exemplary embodiment the invention.
Figure 6:
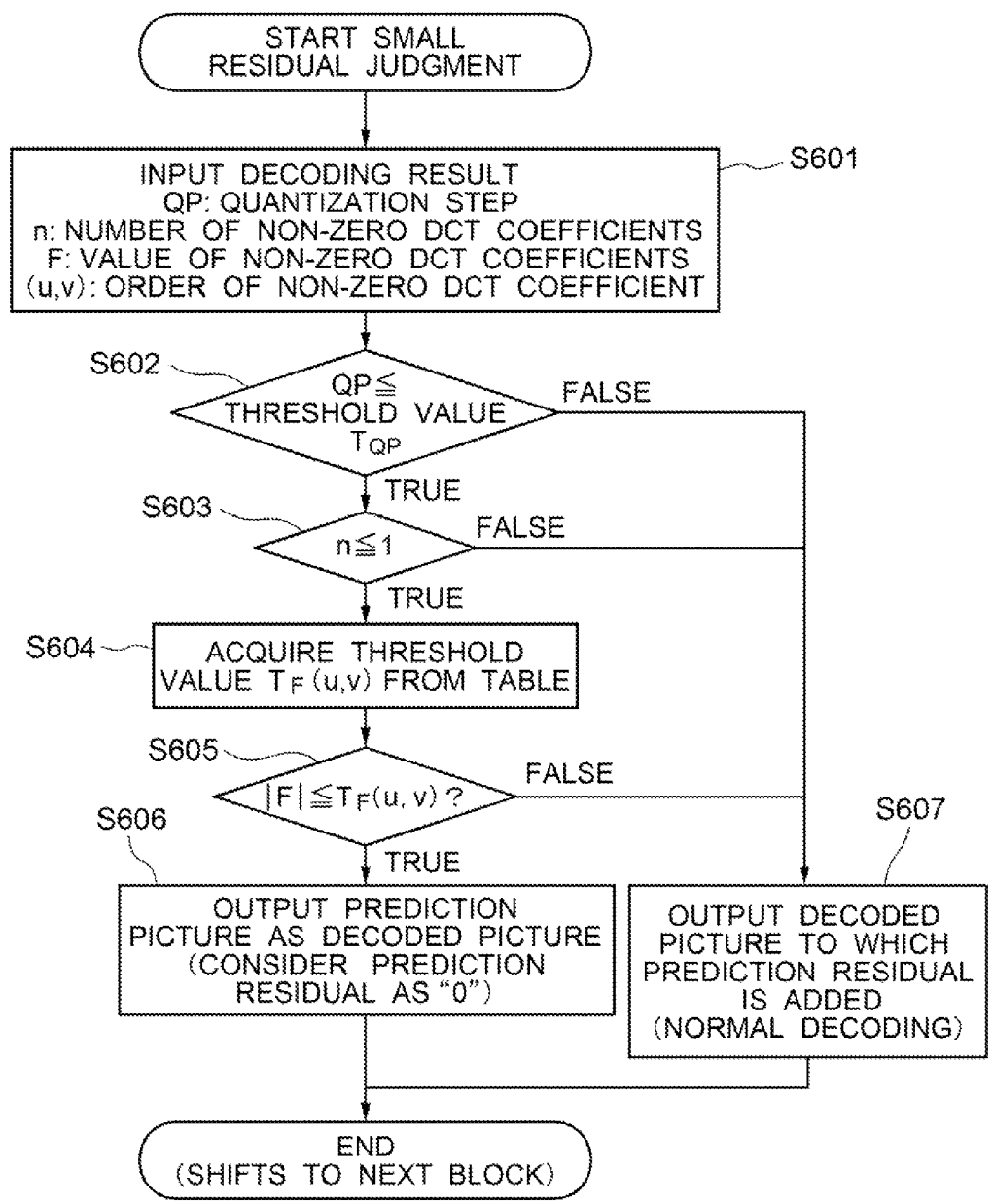
FIG. 6 is an illustration showing operations of a judging device according to a second exemplary embodiment of the invention.
Figure 8:
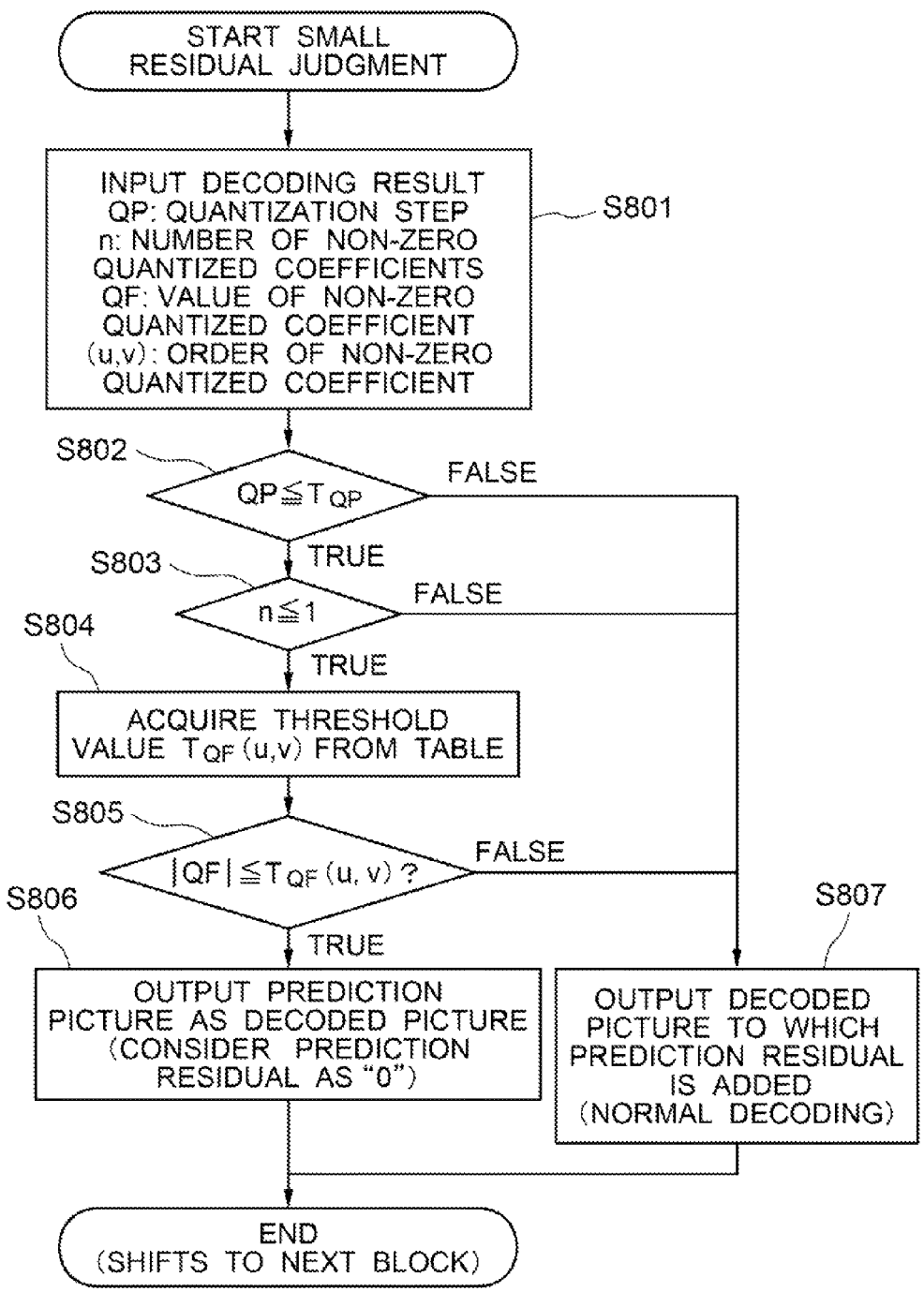
FIG. 8 is an illustration showing an example of operations of a judging device according to a third exemplary embodiment of the invention.
Figure 10:
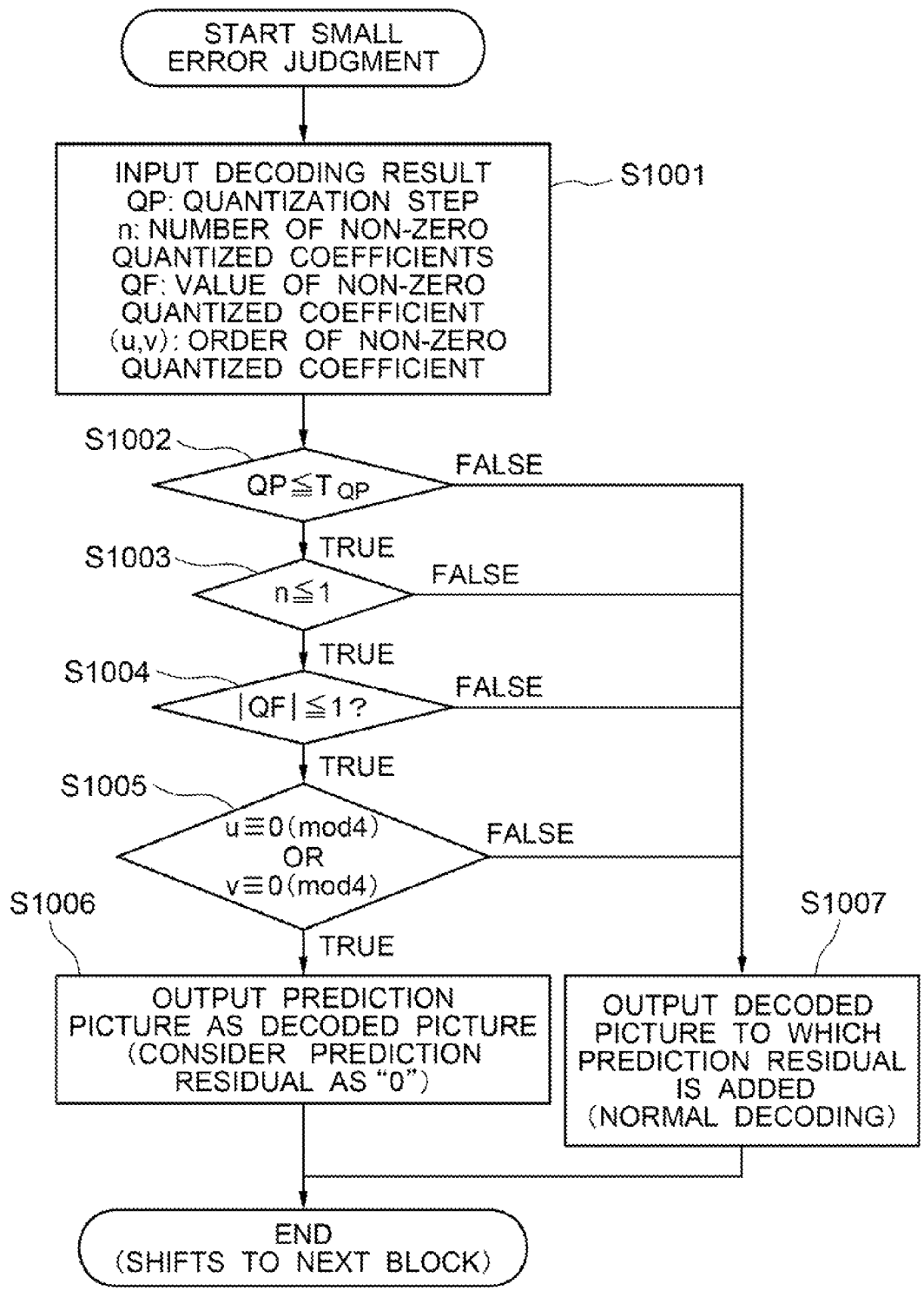
FIG. 10 is an illustration showing an example of operations of the judging device according to the second exemplary embodiment of the invention.
Figure 12:
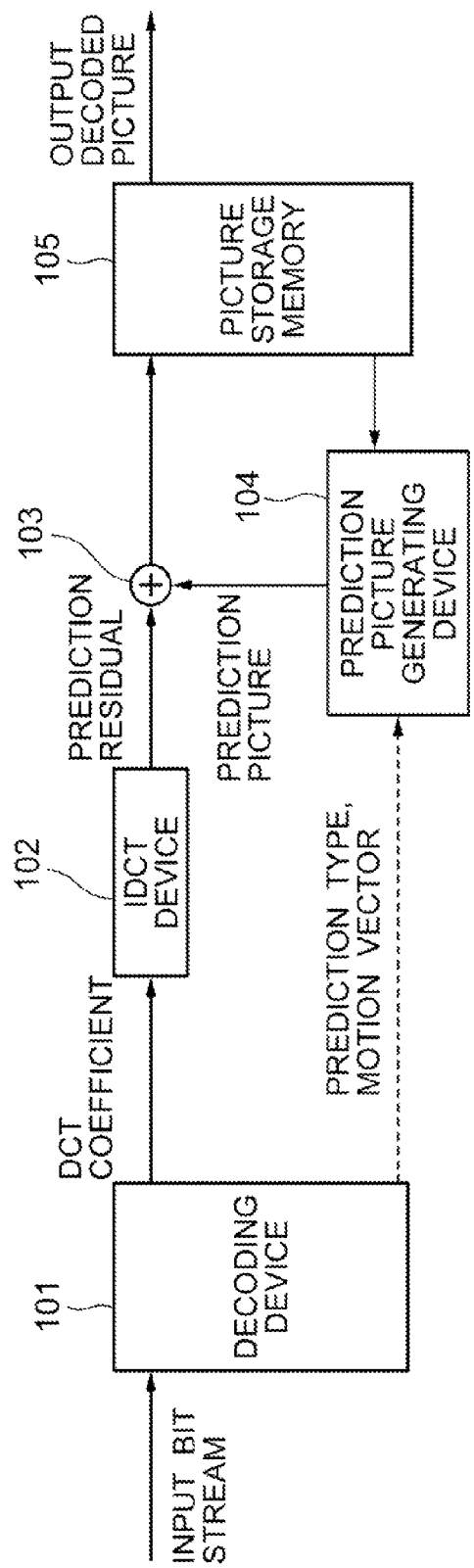
FIG. 12 is an illustration showing a structure of a general-purpose moving picture decoding device.

101 Decoding device
102 IDCT device
103 Adding device
104 A prediction picture generating device
105 Picture storage memory
106 Judging device
107 Selecting device
108 Threshold value judging device
109 Norm calculating device

The invention claimed is:

1. A moving picture decoding device which receives a moving picture bit stream compressed by an encoding process which utilizes interframe prediction and two-dimensional discrete cosine transform, and generates a decoded picture from an interframe prediction picture generated based on information obtained by decoding the bit stream and a result obtained by adding block-unit prediction residuals generated by performing two-dimensional inverse discrete cosine transform on discrete cosine transform coefficients found by performing inverse quantization of quantized coefficients obtained from the bit stream, the moving picture decoding device comprising:
a judging device for judging as small the prediction residual of a block when the block satisfies all three following conditions: a first condition specifying that the block has a quantization step size in the inverse quantization equal to or smaller than "1", a second condition specifying the black has a number of non-zero elements contained in the quantized discrete cosine transform coefficients is "1", and a third condition specifying that the block has a size of the non-zero element is equal to or smaller than a threshold value;
a selecting device which obtains the decoded picture by replacing the prediction residual with "0" and adding the "0"-replaced prediction residual to the interframe prediction picture for the block having the prediction residual that the judging device judged as small, and by adding the prediction residual to the interframe prediction picture for other blocks,
wherein the threshold value is set for each discrete cosine transform order number of the non-zero element.

2. The moving picture decoding device as claimed in claim 1, wherein when the block size is 8×8, the threshold value is "1" in a case where the discrete cosine transform order number of the non-zero element is (0, 0), (1, 0), (2, 0), (3, 0), (4, 0), (5, 0), (6, 0), (7, 0), (0, 1), (4, 1), (0, 2), (4, 2), (0, 3), (4, 3), (0, 4), (1, 4), (2, 4), (3, 4), (4, 4), (5, 4), (6, 4), (7, 4), (0, 5), (4, 5), (0, 6), (4, 6), (0, 7), or (4, 7), and the threshold value is "0" in other cases.

3. The moving picture decoding device as claimed in claim 1, wherein when the block size is of 8×8, the threshold value is "1" in a case where the discrete cosine transform order number of the non-zero element is (0, 0), (2, 0), (4, 0), (6, 0), (0, 2), (4, 2), (0, 4), (2, 4), (4, 4), (6, 4), (0, 6), or (4, 6), and the threshold value is "0" in other cases.

4. A moving picture decoding method which receives a moving picture bit stream compressed by an encoding process which utilizes interframe prediction and two-dimensional discrete cosine transform, and generates a decoded picture from an interframe prediction picture generated based on information obtained by decoding the bit stream and a result obtained by adding block-unit prediction residuals generated by performing two-dimensional inverse discrete cosine transform on discrete cosine transform coefficients found by performing inverse quantization of quantized coefficients obtained from the bit stream, the moving picture decoding method comprising:
judging, by a judging device, as small the prediction residual of a block when the block satisfies all three following conditions: a first condition specifying that the block has a quantization step size in the inverse quantization equal to or smaller than "1", a second condition specifying the black has a number of non-zero elements contained in the quantized discrete cosine transform coefficients is "1", and a third condition specifying that the block has a size of the non-zero element is equal to or smaller than a threshold value;
obtaining, by a selecting device, the decoded picture by replacing the prediction residual with "0" and adding the "0"-replaced prediction residual to the interframe prediction picture for the block having the prediction residual that the judging device judged as small, and by adding the prediction residual to the interframe prediction picture for other blocks,
wherein the threshold value is set for each discrete cosine transform order number of the non-zero element.

5. The moving picture decoding method as claimed in claim 4, wherein when the block size is 8×8, the threshold value is "1" in a case where the discrete cosine transform order number of the non-zero element is (0, 0), (1, 0), (2, 0), (3, 0), (4, 0), (5, 0), (6, 0), (7, 0), (0, 1), (4, 1), (0, 2), (4, 2), (0, 3), (4, 3), (0, 4), (1, 4), (2, 4), (3, 4), (4, 4), (5, 4), (6, 4), (7, 4), (0, 5), (4, 5), (0, 6), (4, 6), (0, 7), or (4, 7), and the threshold value is "0" in other cases.

6. The moving picture decoding method as claimed in claim 4, wherein when the block size is of 8×8, the threshold value is "1" in a case where the discrete cosine transform order number of the non-zero element is (0, 0), (2, 0), (4, 0), (6, 0), (0, 2), (4, 2), (0, 4), (2, 4), (4, 4), (6, 4), (0, 6), or (4, 6), and the threshold value is "0" in other cases.

7. A non-transitory computer-readable data storage medium storing a computer program executable by a computing device to perform a moving picture decoding method which receives a moving picture bit stream compressed by an encoding process which utilizes interframe prediction and two-dimensional discrete cosine transform, and generates a decoded picture from an interframe prediction picture generated based on information obtained by decoding the bit stream and a result obtained by adding block-unit prediction residuals generated by performing two-dimensional inverse discrete cosine transform on discrete cosine transform coefficients found by performing inverse quantization of quantized coefficients obtained from the bit stream, the moving picture decoding method comprising:
judging as small the prediction residual of a block when the block satisfies all three following conditions: a first condition specifying that the block has a quantization step size in the inverse quantization equal to or smaller than "1", a second condition specifying the black has a number of non-zero elements contained in the quantized discrete cosine transform coefficients is "1", and a third condition specifying that the block has a size of the non-zero element is equal to or smaller than a threshold value;

obtaining the decoded picture by replacing the prediction residual with "0" and adding the "0"-replaced prediction residual to the interframe prediction picture for the block having the prediction residual that the judging device judged as small, and by adding the prediction residual to the interframe prediction picture for other blocks, wherein the threshold value is set for each discrete cosine transform order number of the non-zero element.

8. The non-transitory computer-readable data storage medium as claimed in claim 7, wherein when the block size is 8×8, the threshold value is "1" in a case where the discrete cosine transform order number of the non-zero element is (0, 0), (1, 0), (2, 0), (3, 0), (4, 0), (5, 0), (6, 0), (7, 0), (0, 1), (4, 1), (0, 2), (4, 2), (0, 3), (4, 3), (0, 4), (1, 4), (2, 4), (3, 4), (4, 4), (5, 4), (6, 4), (7, 4), (0, 5), (4, 5), (0, 6), (4, 6), (0, 7), or (4, 7), and the threshold value is "0" in other cases.

9. The non-transitory computer-readable data storage medium as claimed in claim 7, wherein when the block size is of 8×8, the threshold value is "1" in a case where the discrete cosine transform order number of the non-zero element is (0, 0), (2, 0), (4, 0), (6, 0), (0, 2), (4, 2), (0, 4), (2, 4), (4, 4), (6, 4), (0, 6), or (4, 6), and the threshold value is "0" in other cases.

* * * * *